United States Patent
Box

(10) Patent No.: US 9,316,829 B2
(45) Date of Patent: Apr. 19, 2016

(54) DISPLAY DEVICE, IN PARTICULAR FOR A MOTOR VEHICLE

(76) Inventor: Benoit Box, L'Isle Adam (FR)

( * ) Notice: Subject to any disclaimer, the term of this patent is extended or adjusted under 35 U.S.C. 154(b) by 190 days.

(21) Appl. No.: 13/574,769

(22) PCT Filed: Nov. 3, 2010

(86) PCT No.: PCT/EP2010/006694
§ 371 (c)(1),
(2), (4) Date: Oct. 26, 2012

(87) PCT Pub. No.: WO2011/091825
PCT Pub. Date: Aug. 4, 2011

(65) Prior Publication Data
US 2013/0038511 A1 Feb. 14, 2013

(30) Foreign Application Priority Data
Jan. 27, 2010 (DE) .......................... 10 2010 005 783

(51) Int. Cl.
- *G09G 5/00* (2006.01)
- *G03H 1/00* (2006.01)
- *G02B 27/14* (2006.01)
- *G02B 27/01* (2006.01)
- *B60K 37/02* (2006.01)

(52) U.S. Cl.
CPC ............ *G02B 27/0101* (2013.01); *B60K 37/02* (2013.01); *B60K 2350/2052* (2013.01); *G02B 2027/0156* (2013.01); *G02B 2027/0181* (2013.01)

(58) Field of Classification Search
CPC ........... B60K 37/02; B60K 2350/2052; G02B 27/01; G02B 2027/0156; G02B 2027/0181
USPC .................................. 345/8; 359/630, 632, 13
See application file for complete search history.

(56) References Cited

U.S. PATENT DOCUMENTS

| | | | |
|---|---|---|---|
| 521,447 A | 6/1894 | Pickles | |
| 4,837,551 A | 6/1989 | Iino | |
| 5,237,455 A * | 8/1993 | Bordo et al. | .................. 359/632 |

(Continued)

FOREIGN PATENT DOCUMENTS

| | | |
|---|---|---|
| GB | 2390259 A | 12/2003 |
| JP | S62200038 | 12/1987 |
| JP | 2007302195 | 11/2007 |

OTHER PUBLICATIONS

International Preliminary Report on Patentability mailed Aug. 7, 2012.

(Continued)

*Primary Examiner* — Robin Mishler
*Assistant Examiner* — Kuo Woo
(74) *Attorney, Agent, or Firm* — Fletcher Yoder, P.C.

(57) ABSTRACT

The present invention relates to a display device, in particular for a motor vehicle, including a projection module for generating an image to be projected in a direction normal to the viewing direction of a user of the display device along an optical path, wherein the display device includes a reflection element that can be moved between a first rest position and a second display position, the reflection element in the display position thereof being provided in the direction normal to the viewing direction of the user, and the reflection element being subjected to a rotation movement about a fixed rotation axis during the movement of the reflection element between the first rest position and the second display position thereof.

6 Claims, 2 Drawing Sheets

(56) References Cited

U.S. PATENT DOCUMENTS

Figure 1:
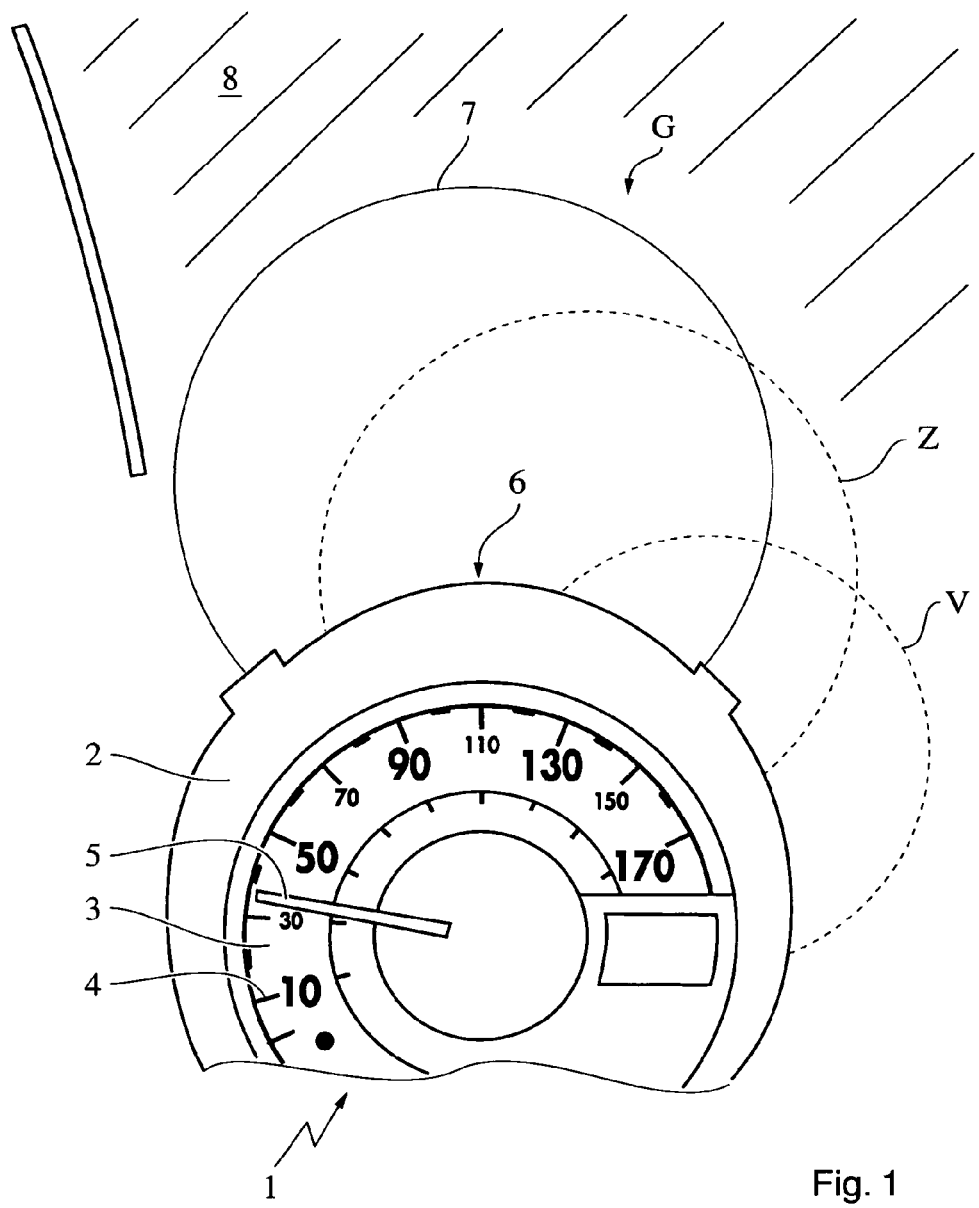

| | | | |
|---|---|---|---|
| 5,394,203 A | 2/1995 | Murphy et al. | |
| 5,748,346 A | 5/1998 | David et al. | |
| 5,786,932 A | 7/1998 | Pniel | |
| 8,619,369 B2 * | 12/2013 | Box et al. | 359/632 |
| 2004/0127262 A1 | 7/2004 | Ohno | |
| 2004/0229662 A1 | 11/2004 | Chadha | |
| 2005/0259301 A1 * | 11/2005 | Aoki et al. | 359/13 |
| 2008/0285138 A1 * | 11/2008 | Lebreton | 359/630 |

OTHER PUBLICATIONS

International Search Report for application No. PCT/EP2010/006694 mailed Aug. 12, 2011.

Japanese Office Action dated Jan. 20, 2014.

* cited by examiner

DISPLAY DEVICE, IN PARTICULAR FOR A MOTOR VEHICLE

CROSS REFERENCE TO RELATED APPLICATIONS

This application claims priority from and the benefit of PCT Application No. PCT/EP2010/006694, filed on Nov. 3, 2010 and German Patent DE 10 2010 005 783.5, filed on Jan. 27, 2010; both entitled "Display device, in Particular for a Motor Vehicle", which are herein incorporated by reference.

BACKGROUND

The present invention relates to a display device, in particular for a motor vehicle.

Display devices of head-up display (HUD) type are known, in particular with the projection of an image toward a windshield as described in the document U.S. Pat. No. 521,447 or toward a reflection element.

The head-up display devices make it possible to project information into the field of vision of the space in front of the motor vehicle so that the driver of the motor vehicle can read this information without diverting the eyes from the space in front of the motor vehicle. At the same time, the information can be read without modifying the accommodation of the eyes of the driver of the vehicle.

It is advantageous—depending on the needs or the tastes of a user of the vehicle—for the reflection element to be able to be either used or be in a rest state.

One drawback of such devices according to the prior art lies in the fact that the change of position of the reflection element and of a cover means requires the use of often complicated mechanical means which also have weaknesses upon daily and prolonged use over a number of years.

The aim of the present invention is in particular to overcome the drawbacks of the prior art, and in particular those cited above, and also to propose a head-up display device that has a reflection element which can be positioned in a rest position and in a display position via a simple mechanism that has great stability and a prolonged life despite frequent use.

SUMMARY

According to the present invention, this aim is achieved by a display device, in particular for a motor vehicle, comprising a projection module for generating an image to be projected in the normal direction of gaze of a user of the display device along an optical path, the display device comprising a reflection element which can be moved between a first rest position and a second display position, the reflection element in its display position being arranged in the normal direction of gaze of the user, the reflection element comprising a main extension plane, and, in the movement of the reflection element between its first rest position and its second display position, the reflection element is subjected to a rotational movement about a rotation axis, the rotation axis extending in a direction essentially perpendicular to the main extension plane of the reflection element.

Through such an embodiment of a display device, it is advantageously possible to produce the movement mechanism of the reflection element simply and with stability.

A preferred refinement of the invention lies in the fact that the display device is associated with a dashboard, the dashboard comprising at least one round dial indicator, comprising a dial, the rotation axis of the reflection element extending in a direction essentially perpendicular to the main extension plane of the dial of the round dial indicator.

Another preferred refinement of the invention lies in the fact that the main extension plane of the reflection element and the main extension plane of the dial are arranged essentially parallel.

A particularly preferred refinement of the invention lies in the fact that, in the rest position of the reflection element, the reflection element is positioned at least partially behind the dial relative to the normal direction of gaze of the user.

Through these refinements of the display device, it is advantageously possible to provide for the movement of the cover means, also in a simple and mechanically stable manner.

Another preferred refinement of the invention lies in the fact that the display device comprises a means for covering the reflection element, the covering means covering the reflection element when the latter is positioned in its first rest position.

Through such an embodiment of a display device, it is advantageously possible to eliminate or at least reduce the risk of damage to the reflection element when the latter is in its first rest position.

According to a variant of the present invention, it is also preferable for the reflection element to be driven between its first rest position and its second display position via a motor.

Another preferred refinement of the invention lies in the fact that the reflection element is positioned in its first rest position in a slot of the dashboard.

Through such an embodiment of a display device, it is advantageously possible to arrange a very good use of the space provided for the reflection element.

Other features and advantages of the invention will become apparent from reading the following description of a particular, nonlimiting embodiment of the present invention.

DRAWINGS

Figure 2:
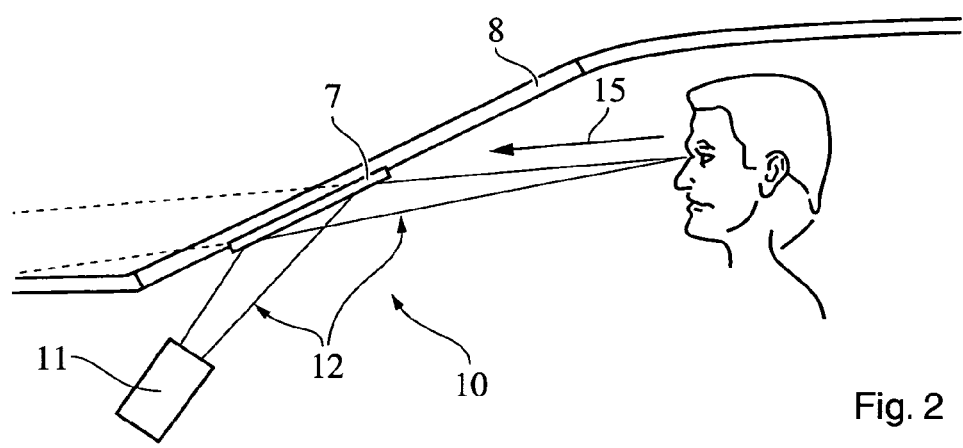

The invention will be better understood from the following description, which relates to preferred embodiments, given as nonlimiting examples and explained with reference to the appended schematic drawings, in which:

FIG. 1 is a schematic view of a round dial indicator of a dashboard with a reflection element in a number of positions, and FIG. 2 is a cross-sectional schematic view of a display device according to the present invention.

DETAILED DESCRIPTION

As FIG. 2 of the appended drawing shows, a display device 10 according to the present invention comprises a projection module 11 which generates an image in the normal direction of gaze 15 of a user of the display device 10 along an optical path 12.

The optical path 12 normally includes at least one reflection element 7. In this way, the optical path 12 may include a (single) reflection element, as represented in FIG. 2. Moreover, the optical path 12 may also include two reflection elements.

The normal direction of gaze 15 is the viewing direction of a user of the display device 10, in particular a vehicle driver, when the latter is looking, in particular through a windshield 8, at the outside environment in front of the vehicle.

According to the present invention, the reflection element 7 is an element positioned at a distance from the windshield 8. The reflection element 7 can be positioned in a first rest position and in a second display position. When the reflection element 7 is positioned in its second display position, the reflection element 7 is typically positioned almost vertically so that the user of the display device can look through the reflection element 7. When the reflection element 7 is positioned in its first rest position, the reflection element 7 is subjected to a rotational movement so that the reflection element 7 is not (or is almost not) visible to the user.

According to the present invention, the rotation axis of this rotational movement of the reflection element 7 between its first rest position and its second display position extends in a direction essentially perpendicular to the main extension plane of the reflection element 7.

This can be seen in FIG. 1, which represents a schematic view of a round dial indicator 2 of a dashboard 1 with a reflection element 7 in a number of positions.

The reflection element 7 can be positioned in its first rest position V, in an intermediate position Z and in its second display position G. The dashboard 1 (also called instrument panel) comprises the round dial indicator 2 with a dial 3, a graduation 4, and a needle 5. The dashboard 1 also comprises a protruding protection 6 to enable the user to read the instruments and displays even in conditions of strong sunlight.

According to a preferred embodiment of the invention, a cover means may be provided to cover the reflection element 7 when the latter is positioned in its first rest position.

Preferably, the rotation axis of the reflection element 7 extends in a direction essentially perpendicular to the main extension plane of the dial 3 of the round indicator 2. Moreover, the main extension plane of the reflection element 7 and the main extension plane of the dial 3 can preferably be positioned or oriented essentially parallel.

Thus, it is advantageously possible for the reflection element 7 in its first rest position to be positioned in a void or in a slot behind the dashboard or in a slot in the dashboard 1. Such a void or such a slot is in any case positioned behind the plane of the dial 3 of the round dial instrument 2.

Moreover, it is advantageously possible for the reflection element 7 to be positioned in its first rest position so that, for a user, the reflection element 7 can be stowed away almost without any apparent slot.

The invention claimed is:

1. A display device for a motor vehicle, comprising a projection module configured to generate an image to be projected in a normal direction of gaze of a user of the display device along an optical path, and a reflection element which is movable between a first rest position and a second display position, the reflection element in the second display position being arranged in the normal direction of gaze of the user and configured to direct the image along the optical path;
    wherein the reflection element is configured to enable the user to look through the reflection element while the reflection element is in the second display position, the reflection element comprises a main extension plane, and, in the movement of the reflection element between the first rest position and the second display position, the reflection element is subjected to a rotational movement about a rotation axis, the rotation axis extending in a direction substantially perpendicular to the main extension plane of the reflection element; and
    wherein the display device is associated with a dashboard, the dashboard comprises at least one dial indicator comprising a dial, the rotation axis of the reflection element extends in a direction substantially perpendicular to a main extension plane of the dial of the at least one dial indicator, the main extension plane of the reflection element and the main extension plane of the dial are arranged substantially parallel to one another, and in the first rest position of the reflection element, the reflection element is positioned behind and at least partially concealed by the dial along the normal direction of gaze of the user.

2. The display device as claimed in claim 1, wherein the display device comprises a cover configured to cover the reflection element when the reflection element is positioned in the first rest position.

3. The display device as claimed in claim 1, wherein the reflection element is configured to be driven between the first rest position and the second display position via a motor.

4. The display device as claimed in claim 1, wherein the reflection element is positioned in the first rest position in a slot of the dashboard.

5. The display device as claimed in claim 4, wherein the slot is positioned behind the main extension plane of the dial of the at least one dial indicator along the normal direction of gaze of the user.

6. The display device as claimed in claim 4, wherein the reflection element is subjected to the rotational movement only about the rotation axis from the first rest position in the slot to the second display position.

* * * * *